United States Patent
Kishimoto et al.

(10) Patent No.: US 11,177,484 B2
(45) Date of Patent: Nov. 16, 2021

(54) BATTERY CATHODE, COMPOSITION FOR BATTERY CATHODE CATALYTIC LAYER, AND BATTERY

(71) Applicant: NISSHINBO HOLDINGS INC., Tokyo (JP)

(72) Inventors: Takeaki Kishimoto, Funabashi (JP); Dustin William H Banham, West Vancouver (CA); Siyu Ye, Burnaby (CA); Katie Ling Pei, West Vancouver (CA); Kyoung Bai, Vancouver (CA)

(73) Assignee: NISSHINBO HOLDINGS INC., Tokyo (JP)

( * ) Notice: Subject to any disclaimer, the term of this patent is extended or adjusted under 35 U.S.C. 154(b) by 179 days.

(21) Appl. No.: 16/301,400

(22) PCT Filed: May 10, 2017

(86) PCT No.: PCT/JP2017/017696
§ 371 (c)(1),
(2) Date: Nov. 13, 2018

(87) PCT Pub. No.: WO2017/203980
PCT Pub. Date: Nov. 30, 2017

(65) Prior Publication Data
US 2019/0305323 A1  Oct. 3, 2019

(30) Foreign Application Priority Data
May 27, 2016 (JP) .............................. JP2016-106505

(51) Int. Cl.
*H01M 4/96* (2006.01)
*H01M 4/90* (2006.01)
(Continued)

(52) U.S. Cl.
CPC ............... *H01M 4/96* (2013.01); *B01J 23/80* (2013.01); *B01J 23/835* (2013.01); *H01M 4/86* (2013.01);
(Continued)

(58) Field of Classification Search
None
See application file for complete search history.

(56) References Cited

U.S. PATENT DOCUMENTS

2009/0239116 A1* 9/2009 Okumura ............... H01M 4/926
429/513
2010/0273086 A1* 10/2010 Oota ...................... H01M 4/881
429/483
2011/0143253 A1* 6/2011 Miyata ................ H01M 4/9008
429/480

FOREIGN PATENT DOCUMENTS

EP   2 298 443 A1   3/2011
EP   2 497 573 A1   9/2012
(Continued)

OTHER PUBLICATIONS

Jun. 13, 2017 International Search Report issued in International Patent Application No. PCT/JP2017/017696.
(Continued)

*Primary Examiner* — Eli S Mekhlin
(74) *Attorney, Agent, or Firm* — Oliff PLC

(57) ABSTRACT

A battery cathode, a composition for a catalyst layer of a battery cathode, and a battery, each achieves excellent performance while using a non-platinum catalyst. The battery cathode includes a catalyst layer, wherein the catalyst layer contains a non-platinum catalyst, has a thickness of 15 μm or more, and has a conductance per 1 cm² of an electrode area of more than 100 S and less than 350 S.

7 Claims, 1 Drawing Sheet

(51) Int. Cl.
*H01M 4/86* (2006.01)
*B01J 23/80* (2006.01)
*B01J 23/835* (2006.01)
*H01M 8/10* (2016.01)

(52) U.S. Cl.
CPC ............. *H01M 4/90* (2013.01); *H01M 8/10* (2013.01); *H01M 2004/8689* (2013.01)

(56) References Cited

FOREIGN PATENT DOCUMENTS

| | | |
|---|---|---|
| JP | 2007-207662 A | 8/2007 |
| JP | 2008-251179 A | 10/2008 |
| JP | 2008-270019 A | 11/2008 |
| JP | 2009-291714 A | 12/2009 |
| JP | 2010-182453 A | 8/2010 |
| JP | 2011-195351 A | 10/2011 |
| JP | 2013-191475 A | 9/2013 |
| JP | 2014-087794 A | 5/2014 |
| JP | 2015-069927 A | 4/2015 |
| JP | 2015-092437 A | 5/2015 |
| JP | 2015-158973 A | 9/2015 |
| JP | 2015-162279 A | 9/2015 |
| JP | 2016-192399 A | 11/2016 |
| WO | 2009/148114 A1 | 12/2009 |

OTHER PUBLICATIONS

Jan. 3, 2020 Extended Search Report issued in European Patent Application No. 17802575.5.
Jun. 16, 2020 Office Action issued in Japanese Patent Application No. 2016-106505.
Feb. 10, 2021 Office Action issued in Korean Patent Application No. 10-2018-7033747.
Pan et al., "Iron-nitrogen-activated carbon as cathode catalyst to improve the power generation of single-chamber air-cathode microbial fuel cells," Bioresource Technology 206, pp. 285-289, 2016.

* cited by examiner

| | | CATALYST | | ELECTROLYTE MATERIAL | | | CATALYST LAYER | | | | | | | BATTERY | |
|---|---|---|---|---|---|---|---|---|---|---|---|---|---|---|---|
| | SAMPLE NAME | MEDIAN DIAMETER (nm) | DENSITY (g/cm³) | EW VALUE (-) | DENSITY (g/cm³) | THICK-NESS (μm) | VOLUME (cm³) | AMOUNT OF CATALYST (mg/cm²) | AMOUNT OF ELECTRO-LYTE (mg/cm²) | ELECTRO-LYTE RATIO (wt%) | (CATALYST +ELECTRO-LYTE) TOTAL VOLUME (cm³) | POROSITY (%) | CONDUCT-ANCE (S) | POWER GENERATION PERFORMANCE (mV at 0.5A/cm²) | PERFORMANCE MAINTENANCE RATIO(%) |
| EXAMPLE C1 | CA-I | 570 | 2.21 | 1100 | 1.98 | 45-55 | 0.225 | 2.50 | 1.67 | 40 | 0.089 | 60.4 | 50 | 480 | 60 |
| EXAMPLE C2 | CA-I | 570 | 2.21 | 830 | 2.06 | 45-55 | 0.225 | 2.50 | 1.67 | 40 | 0.087 | 61.3 | 90 | 500 | 68 |
| EXAMPLE C3 | CA-II | 790 | 2.27 | 1100 | 1.98 | 45-55 | 0.225 | 2.50 | 1.67 | 40 | 0.087 | 61.3 | 100 | 600 | 69 |
| EXAMPLE 1 | CA-II | 790 | 2.27 | 700 | 2.00 | 45-55 | 0.225 | 2.50 | 1.07 | 30 | 0.074 | 67.1 | 130 | 600 | 73 |
| EXAMPLE 2 | CA-II | 790 | 2.27 | 980 | 2.06 | 45-55 | 0.225 | 2.50 | 1.67 | 40 | 0.086 | 61.8 | 145 | 660 | 75 |
| EXAMPLE 3 | CA-II | 790 | 2.27 | 900 | 2.00 | 45-55 | 0.225 | 2.50 | 1.67 | 40 | 0.087 | 61.3 | 150 | 600 | 82 |
| EXAMPLE 4 | CA-II | 790 | 2.27 | 900 | 2.00 | 45-55 | 0.225 | 2.50 | 1.67 | 40 | 0.087 | 61.3 | 150 | 600 | 82 |
| EXAMPLE 5 | CA-I | 570 | 2.21 | 700 | 2.00 | 45-55 | 0.225 | 2.50 | 1.67 | 40 | 0.088 | 60.9 | 177 | 600 | 73 |
| EXAMPLE 6 | CA-II | 790 | 2.27 | 700 | 2.00 | 70-95 | 0.360 | 4.00 | 2.15 | 35 | 0.128 | 64.4 | 180 | 660 | 87 |
| EXAMPLE 7 | CA-II | 790 | 2.27 | 830 | 2.06 | 45-55 | 0.225 | 2.50 | 1.67 | 40 | 0.086 | 61.8 | 200 | 650 | 83 |
| EXAMPLE 8 | CA-III | 650 | 2.25 | 700 | 2.00 | 45-55 | 0.225 | 2.50 | 1.67 | 40 | 0.088 | 60.9 | 212 | 669 | 92 |
| EXAMPLE 9 | CA-II | 790 | 2.27 | 800 | 2.00 | 45-55 | 0.225 | 2.50 | 1.67 | 40 | 0.087 | 61.3 | 225 | 630 | 84 |
| EXAMPLE 10 | CA-II | 790 | 2.27 | 700 | 2.00 | 70-95 | 0.360 | 4.00 | 2.67 | 40 | 0.139 | 61.4 | 250 | 590 | 91 |
| EXAMPLE 11 | CA-II | 790 | 2.27 | 700 | 2.00 | 45-55 | 0.225 | 2.50 | 1.67 | 40 | 0.087 | 61.3 | 260 | 660 | 83 |
| EXAMPLE 12 | CA-II | 790 | 2.27 | 700 | 2.06 | 45-55 | 0.225 | 2.50 | 1.67 | 40 | 0.086 | 61.8 | 300 | 620 | 85 |
| EXAMPLE 13 | CA-II | 790 | 2.27 | 500 | 2.00 | 45-55 | 0.225 | 2.50 | 1.67 | 40 | 0.087 | 61.3 | 335 | 605 | 80 |
| EXAMPLE 14 | CA-II | 790 | 2.27 | 700 | 2.00 | 15-25 | 0.090 | 1.50 | 1.00 | 40 | 0.052 | 42.2 | 337 | 620 | 71 |
| EXAMPLE C4 | CA-II | 790 | 2.27 | 700 | 2.00 | 45-55 | 0.225 | 2.50 | 2.50 | 50 | 0.106 | 52.9 | 350 | 550 | 50 |

BATTERY CATHODE, COMPOSITION FOR BATTERY CATHODE CATALYTIC LAYER, AND BATTERY

TECHNICAL FIELD

The present invention relates to a battery cathode, a composition fora catalyst layer of a battery cathode, and a battery.

BACKGROUND ART

Currently, a platinum catalyst is used for an electrode of a fuel cell. However, there are many problems to be solved. For example, the reserves of platinum are limited. In a polymer electrolyte fuel cell (PEFC), the use of platinum increases cost. In an air cell, the use of platinum increases cost, and in addition, platinum causes a chemical reaction, such as decomposition of an electrolyte solution.

Therefore, an alternative technology which does not use platinum has been developed. Specifically, for example, Patent Literature 1 discloses an electrode catalyst for a fuel cell formed of a carbonized material having a shell-like structure.

CITATION LIST

Patent Literature

[Patent Literature 1] JP 2007-207662 A

SUMMARY OF INVENTION

Technical Problem

However, when a non-platinum catalyst having low catalytic activity compared to platinum is used in a catalyst layer of a cathode of the fuel cell, there has hitherto been a problem in that the thickness of the catalyst layer is increased compared to that in a case of using platinum, resulting in a degradation of performance of the fuel cell.

The present invention has been made in view of the above-mentioned problem, and one of the objects of the present invention is to provide a battery cathode, a composition fora catalyst layer of a battery cathode, and a battery each achieving excellent performance while using a non-platinum catalyst.

Solution to Problem

A battery cathode according to one embodiment of the present invention, for achieving the object, is a battery cathode, including a catalyst layer, wherein the catalyst layer contains a non-platinum catalyst, has a thickness of 15 μm or more, and has a conductance per 1 $cm^2$ of an electrode area of more than 100 S and less than 350 S. According to the one embodiment of the present invention, a battery cathode achieving excellent performance while using the non-platinum catalyst is provided.

In addition, in the battery cathode, the catalyst layer may further contain an electrolyte material having an EW value of 300 or more and 1,000 or less. In addition, in the battery cathode, the catalyst layer may have a ratio of a weight of an electrolyte material to a total weight of the non-platinum catalyst and the electrolyte material contained in the catalyst layer of 20% or more and less than 50%.

In addition, in the battery cathode, the non-platinum catalyst may be a carbon catalyst. In this case, the carbon catalyst may contain a metal other than platinum. In addition, the battery cathode may be a cathode of a fuel cell.

A composition for a catalyst layer of a battery cathode according to one embodiment of the present invention, for achieving the object, is a composition fora catalyst layer of a battery cathode, which is used for forming a catalyst layer of a battery cathode and includes a non-platinum catalyst, wherein the composition is used for forming the catalyst layer having a thickness of 15 μm or more and having a conductance per 1 $cm^2$ of an electrode area of more than 100 S and less than 350 S. According to the embodiment of the present invention, a composition for a catalyst layer of a battery cathode achieving excellent performance while using the non-platinum catalyst is provided.

A battery according to one embodiment of the present invention, for achieving the object, includes any one of the above-mentioned battery cathodes. According to the embodiment of the present invention, a battery achieving excellent performance while using the non-platinum catalyst is provided.

In addition, the battery may be a fuel cell.

Advantageous Effects of Invention

According to one embodiment of the present invention, a battery cathode, a composition for a catalyst layer of a battery cathode, and a battery achieving excellent performance while using the non-platinum catalyst are provided.

BRIEF DESCRIPTION OF DRAWINGS

FIG. 1 is an explanatory view for showing evaluation results of the characteristics of a battery and a catalyst layer of a battery cathode in an Example according to one embodiment of the present invention.

DESCRIPTION OF EMBODIMENTS

Now, embodiments of the present invention will be described. The present invention is not limited to examples shown in these embodiments.

A battery cathode according to one embodiment of the present invention (hereinafter referred to as "cathode of the present invention") is a battery cathode including a catalyst layer, in which the catalyst layer contains a non-platinum catalyst, has a thickness of 15 μm or more, and has a conductance per 1 $cm^2$ of an electrode area of more than 100 S and less than 350 S.

The inventors of the present invention have performed extensive investigations into technical means regarding a battery cathode using a non-platinum catalyst, and as a result, have surprisingly and uniquely found that, when the conductance of a catalyst layer of the battery cathode is adjusted to fall within a specific range, the performance of a battery including the battery cathode is effectively maintained, that is, the durability of the battery is effectively improved. Thus, the present invention has been completed.

The catalyst layer of the cathode of the present invention is formed through use of a composition including a non-platinum catalyst. In this regard, a composition for a catalyst layer of a battery cathode according to one embodiment of the present invention (hereinafter referred to as "composition of the present invention") is a composition which is used for forming a catalyst layer of a battery cathode and includes a non-platinum catalyst, in which the composition is used for forming the catalyst layer having a thickness of 15 μm or more and having a conductance per 1 $cm^2$ of an electrode area of more than 100 S and less than 350 S.

Accordingly, the use of the composition including a non-platinum catalyst for forming a catalyst layer of a battery cathode, the catalyst layer having a thickness of 15

µm or more and having a conductance per 1 cm² of an electrode area of more than 100 S and less than 350 S, is included in the embodiment.

A battery according to one embodiment of the present invention (hereinafter referred to as "battery of the present invention") includes the cathode of the present invention described above. The battery of the present invention is not particularly limited as long as the battery includes the cathode of the present invention, but may be, for example, a chemical battery and is preferably a fuel cell.

When the battery of the present invention is a fuel cell, the cathode of the present invention is a cathode of the fuel cell. In this case, the battery of the present invention is, for example, preferably a polymer electrolyte fuel cell, particularly preferably a polymer electrolyte fuel cell using hydrogen as a fuel. The battery of the present invention may include a membrane electrode assembly (MEA) including the cathode of the present invention. The membrane electrode assembly may include, for example, an electrolyte membrane, the cathode of the present invention, an anode, and a gas diffusion layer.

The conductance of the catalyst layer of the cathode of the present invention refers to a conductance per 1 cm² of an electrode area (cathode area) measured by an alternating current impedance method using a single cell including the cathode of the present invention under the conditions of a humidity of the single cell of 120% RH and a temperature of the single cell of 75° C. (hereinafter sometimes referred to simply as "conductance").

The conductance of the catalyst layer of the cathode of the present invention is not particularly limited as long as the conductance falls within a range of more than 100 S and less than 350 S, but is, for example, preferably 105 S or more and 345 S or less, more preferably 130 S or more and 337 S or less, particularly preferably 178 S or more and 335 S or less.

The thickness of the catalyst layer of the cathode of the present invention is not particularly limited as long as the thickness is 15 µm or more, but may be, for example, 15 µm or more and 150 µm or less, 15 µm or more and 130 µm or less, or 15 µm or more and 100 µm or less. In addition, the thickness of the catalyst layer of the cathode of the present invention may be, for example, 30 µm or more and 150 µm or less, 30 µm or more and 130 µm or less, or 30 µm or more and 100 µm or less.

The non-platinum catalyst is not particularly limited as long as the non-platinum catalyst is a catalyst having catalytic activity in the battery cathode but is not platinum, and may be, for example, a carbon catalyst and/or a metal catalyst. The metal catalyst may be, for example, one or more selected from a group consisting of a metal oxide-based non-platinum catalyst, a metal complex catalyst, and an alloy catalyst (e.g., an alloy catalyst of an iron group element and another transition metal and/or a ruthenium-based alloy catalyst).

However, the non-platinum catalyst is particularly preferably a carbon catalyst. The carbon catalyst is formed of a carbon material having catalytic activity (e.g., oxygen reduction activity). The carbon catalyst is produced by, for example, carbonizing a raw material including an organic substance. That is, in this case, the carbon catalyst is a carbonized product of the raw material including an organic substance.

The carbon catalyst may contain a metal other than platinum (non-platinum metal). The non-platinum metal may be, for example, one or more kinds selected from a group consisting of Group 3 elements to Group 14 elements in the periodic table. More specifically, the non-platinum metal is preferably one or more kinds selected from a group consisting of, for example, titanium (Ti), chromium (Cr), manganese (Mn), iron (Fe), cobalt (Co), nickel (Ni), copper (Cu), zinc (Zn), germanium (Ge), silver (Ag), and tin (Sn).

The content of the non-platinum metal in the carbon catalyst is not particularly limited, but may be, for example, 0.001 wt % or more and 30.000 wt % or less or 0.002 wt % or more and 20.000 wt % or less.

The carbon catalyst containing the non-platinum metal is produced by, for example, carbonizing a raw material including an organic substance and the non-platinum metal. That is, in this case, the carbon catalyst is a carbonized product of the raw material including an organic substance and the non-platinum metal. The raw material to be carbonized is prepared by, for example, mixing at least the organic substance and the non-platinum metal. In this case, the carbon catalyst is a carbonized product of a mixture containing the organic substance and the non-platinum metal.

The carbon catalyst may contain the non-platinum metal in the inside thereof. That is, when the carbon catalyst is the carbonized product of the raw material including the organic substance and the non-platinum metal, the carbon catalyst contains the non-platinum metal derived from the raw material at least in the inside thereof. Specifically, when the carbon catalyst has a porous structure, the carbon catalyst may contain the non-platinum metal in the inside of a skeleton of the porous structure.

The carbon catalyst may be a nitrogen-containing carbon catalyst. The nitrogen-containing carbon catalyst is a carbon catalyst having a carbon structure including a nitrogen atom. The nitrogen-containing carbon catalyst is produced by, for example, carbonizing a raw material including a nitrogen-containing organic substance (e.g., an organic compound including one or more nitrogen atoms in a molecule thereof). That is, in this case, the nitrogen-containing carbon catalyst is a carbonized product of the raw material including a nitrogen-containing organic substance. In addition, when the nitrogen-containing carbon catalyst contains the non-platinum metal, the nitrogen-containing carbon catalyst is a carbonized product of a raw material including the nitrogen-containing organic substance and the non-platinum metal.

The organic substance in the raw material to be carbonized in the production of the carbon catalyst is not particularly limited as long as the organic substance is carbonized, and may be, for example, one or more selected from a group consisting of a phenol resin, polyfurfuryl alcohol, furan, a furan resin, a phenol formaldehyde resin, melamine, a melamine resin, an epoxy resin, a nitrogen-containing chelate resin (e.g., one or more kinds selected from the group consisting of polyamine-type, iminodiacetic acid-type, aminophosphoric acid-type, and aminomethylphosphonic acid-type chelate resins), a polyamide-imide resin, pyrrole, polypyrrole, polyvinyl pyrrole, 3-methyl polypyrrole, acrylonitrile, polyacrylonitrile, a polyacrylonitrile-polymethacrylic acid copolymer, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylate, polymethacrylate, polymethacrylic acid, polyurethane, polyamidoamine, and polycarbodiimide.

The conditions of the carbonization are not particularly limited as long as the organic substance in the raw material is carbonized. Specifically, a carbonization temperature may be set to, for example, 300° C. or more and 3,000° C. or less, or 700° C. or more and 2,000° C. or less. In addition, a temperature increase rate for the carbonization temperature may be set to, for example, 0.5° C./min or more and 300° C./min or less. A time period for which the raw material is kept at the carbonization temperature may be set to, for example, 5 minutes or more and 24 hours or less. The carbonization is preferably performed under a flow of inert gas such as nitrogen gas.

The shape of the carbon catalyst is not particularly limited, but the carbon catalyst preferably has a particulate form. In this case, the median diameter of particles of the carbon catalyst may be, for example, 1 nm or more and 2,000 nm or less, 10 nm or more and 1,500 nm or less, or 100 nm or more and 1,000 nm or less. In addition, the median diameter of the particles of the carbon catalyst may be, for example, 600 nm or more and 2,000 nm or less, 600 nm or more and 1,500 nm or less, or 600 nm or more and 1,000 nm or less.

The amount of the non-platinum catalyst (e.g., carbon catalyst) contained in the catalyst layer of the cathode of the present invention per unit area of an electrode (cathode) may be, for example, 0.5 mg/cm$^2$ or more and 8.0 mg/cm$^2$ or less, and is preferably 1.0 mg/cm$^2$ or more and 5.0 mg/cm$^2$ or less.

As described above, the composition of the present invention is a composition which is used for forming a catalyst layer of a battery cathode and includes a non-platinum catalyst. When the composition of the present invention is a composition which is used for forming a catalyst layer of a cathode of a fuel cell, the composition of the present invention includes the non-platinum catalyst and an electrolyte material. In this case, the composition of the present invention is produced by mixing at least the non-platinum catalyst and the electrolyte material, and is a mixture composition containing the non-platinum catalyst and the electrolyte material.

As described above, the cathode of the present invention includes the catalyst layer formed through use of the composition of the present invention. The catalyst layer is formed by applying the composition of the present invention onto a base material, followed by drying. Specifically, for example, when the cathode of the present invention is a cathode of a fuel cell, the cathode of the present invention is produced by, for example, applying the composition of the present invention in a slurry form onto the surface of a carbon material to be used as a gas diffusion layer, or onto the surface of an electrolyte membrane, followed by drying, to thereby form the catalyst layer. In this case, the resultant catalyst layer of the cathode of the fuel cell is formed of the mixture composition containing the non-platinum catalyst and the electrolyte material.

The electrolyte material contained in each of the composition of the present invention and the catalyst layer of the cathode of the present invention is not particularly limited, but for example, each of the composition of the present invention and the catalyst layer may further include, in addition to the non-platinum catalyst, an electrolyte material having an EW value of 300 or more and 1,000 or less. In this case, the EW value of the electrolyte material is preferably 300 or more and 950 or less, particularly preferably 300 or more and 900 or less.

When the electrolyte material having an EW value falling within the above-mentioned range is used, for example, oxygen and protons are efficiently supplied to the non-platinum catalyst (e.g., particles of the carbon catalyst) in the cathode of the fuel cell. The EW value of the electrolyte material refers to an equivalent weight, which is the number of grams of the electrolyte material in a dry state per mole of sulfonic acid groups.

The kind of the electrolyte material is not particularly limited, and any electrolyte material having an EW value falling within the above-mentioned range is preferably used. The electrolyte material is, for example, preferably a perfluorocarbon material. Specifically, the electrolyte material may be, for example, a perfluorocarbon sulfonic acid-based polymer. In this case, the electrolyte material is, for example, preferably a perfluorocarbon material having a polytetrafluoroethylene skeleton and a sulfonic acid group. More specifically, the electrolyte material may be, for example, one or more selected from the group consisting of NAFION (trademark), AQUIVION (trademark), ACIPLEX (trademark), and FLEMION (trademark).

A ratio of the weight of the electrolyte material to the total weight of the non-platinum catalyst and the electrolyte material (hereinafter referred to as "electrolyte ratio") contained in each of the composition of the present invention and the catalyst layer of the cathode of the present invention may be, for example, 20% or more and less than 50%, and is preferably 20% or more and 48% or less, more preferably 30% or more and 48% or less, particularly preferably 32% or more and 48% or less.

When the electrolyte ratio of the catalyst layer is adjusted to fall within the above-mentioned range, for example, the electrolyte material in an amount appropriate for achieving efficient supply of oxygen and protons to the non-platinum catalyst (e.g., particles of the carbon catalyst) is arranged around the non-platinum catalyst in the cathode of the fuel cell.

The amount of the electrolyte material contained in the catalyst layer of the cathode of the present invention per unit area of an electrode (cathode) may be, for example, 0.30 mg/cm$^2$ or more and 6.00 mg/cm$^2$ or less, and is preferably 0.60 mg/cm$^2$ or more and 3.50 mg/cm$^2$ or less.

The porosity of the catalyst layer of the cathode of the present invention is, for example, preferably 30.0% or more and 90.0% or less, more preferably 35.0% or more and 80.0% or less, particularly preferably 43.0% or more and 66.0% or less.

The porosity of the catalyst layer is calculated from the following equation: porosity (%) of catalyst layer=[volume (cm$^3$) of catalyst layer−{volume (cm$^3$) of non-platinum catalyst+volume (cm$^3$) of electrolyte material}]/volume (cm$^3$) of catalyst layer×100.

When the porosity of the catalyst layer is adjusted to fall within the above-mentioned range, for example, voids appropriate for achieving efficient supply of oxygen to the non-platinum catalyst (e.g., particles of the carbon catalyst), and the electrolyte material in an amount appropriate for achieving efficient supply of protons to the non-platinum catalyst, are arranged around the non-platinum catalyst in the cathode of the fuel cell.

Each of the composition of the present invention and the catalyst layer of the cathode of the present invention may not include platinum. In addition, each of the composition of the present invention and the catalyst layer of the cathode of the present invention may not include a precious metal. Specifically, each of the composition of the present invention and the catalyst layer of the cathode of the present invention may not include platinum, gold, osmium, and iridium.

Next, specific Examples according to the embodiments of the present invention will be described.

EXAMPLES

[Production of Carbon Catalyst]

A carbon catalyst was produced as a non-platinum catalyst. 1.0 g of a polyacrylonitrile-polymethacrylic acid copolymer (PAN/PMA) was dissolved in 15 g of dimethylformamide, to thereby prepare a solution (a). In addition, 1.0 g of 2-methylimidazole and 0.578 g of zinc chloride ($ZnCl_2$) were added to be dissolved in 15 g of dimethylformamide, to thereby prepare a solution (b). Next, the solution (a) and the solution (b) were mixed, and 0.187 g of iron powder and 0.3 g Ketjen black (ECP600JD, manufactured by Lion Corporation) were further added thereto and mixed therein. After that, the resultant mixture was vacuum dried at 60° C. all day and night.

The above-mentioned mixture was heated in the atmosphere so as to be increased in temperature from room temperature to 150° C. in 30 minutes, and then increased in temperature from 150° C. to 220° C. in 2 hours. After that, the mixture was kept at 220° C. for 3 hours to be subjected to infusibilization. Thus, the raw material to be carbonized was obtained.

Silicon nitride balls each having a diameter of 10 mm were set in a planetary ball mill (P-7, manufactured by Fritsch Japan Co., Ltd.), and the above-mentioned raw material was pulverized with the planetary ball mill. Then, the raw material having been pulverized was placed in a quartz tube. The raw material was heated to 1,000° C. in an image furnace in a nitrogen atmosphere and kept for 1 hour to be carbonized.

Silicon nitride balls each having a diameter of 10 mm were set in a planetary ball mill (P-7, manufactured by Fritsch Japan Co., Ltd.), and the carbonized material obtained through the above-mentioned carbonization was pulverized with the planetary ball mill. Further, zirconia beads each having a diameter of 0.3 mm and methanol were loaded into a bead mill (manufactured by AIMEX Co., Ltd.), and the carbonized material was pulverized with the bead mill.

20 mL of concentrated hydrochloric acid was added to 1.0 g of the carbonized material obtained through the above-mentioned pulverization, and the resultant was stirred for 30 minutes. After that, the carbonized material was precipitated, and the solution was removed. This treatment was repeated several times, and then distilled water was added to the resultant, followed by stirring. The solution containing the carbonized material was filtered with a filtration membrane and washed with distilled water until the filtrate became neutral. The collected carbonized material was subjected to vacuum drying. Further, the dried carbonized material was pulverized with a mortar.

The carbonized material having been subjected to the metal removal treatment as described above was placed in a quartz tube. The carbonized material was heated to 700° C. in an image furnace in a nitrogen atmosphere and kept in this state for 1 hour to be subjected to heat treatment after the metal removal treatment. Then, the carbonized material after the heat treatment was pulverized with a ball mill. Thus, a carbon catalyst CA-I serving as a non-platinum catalyst in a powder form was obtained.

In addition, a carbon catalyst CA-II was obtained in the same manner as in the above-mentioned case of the carbon catalyst CA-I except that Ketjen black was not used. In addition, a carbon catalyst CA-III was obtained in the same manner as in the above-mentioned case of the carbon catalyst CA-I except that Ketjen black was not used, 0.9 g of iron(III) chloride hexahydrate ($FeCl_3.6H_2O$) was used instead of 0.578 g of zinc chloride, and 0.639 g of tin oxide ($SnO_2$) was used instead of 0.187 g of the iron powder.

[Median Diameter of Carbon Catalyst]

The median diameter (D50) of the carbon catalyst was obtained through measurement of a particle size distribution by a laser diffraction/scattering method. A device to be used in measurement was a laser diffraction particle size analyzer (SALD-7100H, manufactured by Shimadzu Corporation). A sample to be measured was a sample solution prepared by loading about 0.1 g of the carbon catalyst and 40 g of distilled water into a sample bottle, followed by sufficient ultrasonic stirring. The sample solution was poured into a stirring tank so as to give a scattered light level of from 50% to 70%, and the measurement of the particle size distribution was performed.

[Production of Battery Cathode]

A battery cathode including a catalyst layer containing the carbon catalyst was produced. Specifically, first, 0.2 g of the carbon catalyst produced as described above, an electrolyte solution, and 25 g of balls were loaded into a pot, and mixed with a ball mill at 200 rpm for 50 minutes. Thus, a composition for a catalyst layer in a slurry form in which the carbon catalyst was uniformly dispersed was obtained.

Next, the composition for a catalyst layer was applied onto a gas diffusion layer (manufactured by SGL carbon, "25BC") having an area of 45 $cm^2$ so that the amount of the carbon catalyst per unit area of the battery cathode was 1.5 mg/$cm^2$, 2.5 mg/$cm^2$, or 4.0 mg/$cm^2$, followed by drying. Thus, the catalyst layer of the battery cathode containing the carbon catalyst and an electrolyte material was formed. Thus, the battery cathode having an area of 45 $cm^2$ and including the catalyst layer containing the carbon catalyst was obtained.

As the electrolyte material contained in the electrolyte solution used for the production of the cathode (i.e., electrolyte material contained in the catalyst layer of the cathode), a perfluorocarbon material was used. Specifically, eight kinds of commercially available perfluorocarbon sulfonic acid-based polymers having different EW values and/or different molecular structures were used.

The perfluorocarbon sulfonic acid-based polymers may be, for example, a perfluorocarbon material formed of a polytetrafluoroethylene skeleton and a perfluoro side chain having a sulfonic acid group. More specifically, the perfluorocarbon sulfonic acid-based polymers may be, for example, a copolymer of tetrafluoroethylene and perfluoro [2-(fluorosulfonylethoxy) propyl vinyl ether], or a copolymer of tetrafluoroethylene and a fluorinated sulfonyl vinyl ether ($F_2C=CF-O-CF_2-CF_2-SO_2F$).

[Production of Battery Anode]

A battery anode including a catalyst layer containing a platinum catalyst was produced. Specifically, first, 0.5 g of Pt/C (a composite of carbon carrier particles and platinum particles carried on the carbon carrier particles), 10 g of an electrolyte solution, which was a 5 wt % NAFION (trademark) solution (manufactured by Aldrich), 2 g of distilled water, and 10 g of balls were loaded into a pot, and mixed with a ball mill at 200 rpm for 10 minutes. Thus, a composition fora catalyst layer in a slurry form was prepared.

Next, the composition for a catalyst layer was applied onto a gas diffusion layer (manufactured by SGL carbon, "25BC") having an area of 45 cm$^2$ so that the amount of the Pt/C per unit area of the battery anode was 0.3 mg/cm$^2$, followed by drying. Thus, the catalyst layer of the battery anode containing the Pt/C and NAFION (trademark) was formed. Thus, the battery anode having an area of 45 cm$^2$ and including the catalyst layer containing the Pt/C was obtained.

[Production of MEA]

A polymer electrolyte membrane (manufactured by DuPont, "NAFION 112") was arranged between the catalyst layer of the battery cathode and the catalyst layer of the battery anode each produced as described above, and the resultant was subjected to pressure bonding under conditions of 150° C. and 1 MPa for 3 minutes, to thereby produce an MEA.

[Thickness and Volume of Catalyst Layer]

The MEA produced as described above was cut, and the sectional surface was observed with a scanning electron microscope (SEM). On the SEM image obtained, the thickness (cm) of the catalyst layer was measured. Specifically, one SEM image was used for each catalyst layer, and the thickness of the catalyst layer was measured at 5 points in one SEM image. In addition, the volume of the catalyst layer was calculated from the following equation: volume (cm$^3$) of catalyst layer={area (45 cm$^2$) of battery electrode}×{thickness (cm) of catalyst layer}. In the equation, the "thickness (cm) of catalyst layer" is an arithmetic average of the values measured at the above-mentioned 5 points.

[Volume of Carbon Catalyst]

The volume of the carbon catalyst contained in the catalyst layer of the battery cathode was calculated from the following equation: amount (mg/cm$^2$) of carbon catalyst per unit area of battery cathode×area (45 cm$^2$) of electrode/true density (mg/cm$^3$) of carbon catalyst.

The true density of the carbon catalyst was measured by a helium displacement method. A device to be used in measurement was a dry automatic density meter (manufactured by Micromeritics Instrument Corporation, AccuPyc II 1340). A cell with a volume of 1 cm$^3$ was used, and about 0.5 g of the carbon catalyst was placed in the cell. The measurement was performed in a constant-temperature bath at a temperature of 25° C. The measurement was performed ten times, and an average of the values, for each of which a stable volume value had been confirmed, was obtained as the true density of the carbon catalyst.

[Volume and Content of Electrolyte Material]

The volume of the electrolyte material contained in the catalyst layer was calculated from the following equation: volume (cm$^3$) of electrolyte material contained in catalyst layer={weight (mg) of electrolyte material contained in catalyst layer}/{density (mg/cm$^3$) of electrolyte material}.

As the electrolyte material, the commercially available perfluorocarbon sulfonic acid-based polymers having a density of 1,980 mg/cm$^3$, 2,060 mg/cm$^3$, or 2,000 mg/cm$^3$ were used.

The weight of the electrolyte material contained in the catalyst layer was calculated from the following equation: weight (mg) of electrolyte material contained in catalyst layer=weight (mg/cm$^2$) of electrolyte material per unit area of battery cathode×area (45 cm$^2$) of battery cathode.

The weight of the electrolyte material per unit area of the battery cathode was calculated from the following equation: weight (mg/cm$^2$) of electrolyte material per unit area of battery cathode=weight (mg/cm$^2$) of carbon catalyst per unit area of battery cathode×electrolyte ratio (wt %)/{100−electrolyte ratio (wt %)}.

[Electrolyte Ratio]

The electrolyte ratio was calculated from the following equation: electrolyte ratio (wt %)={weight (mg) of electrolyte material contained in catalyst layer}/{weight (mg) of electrolyte material contained in catalyst layer+weight (mg) of carbon catalyst contained in catalyst layer}.

[Porosity of Catalyst Layer]

The porosity of the catalyst layer was calculated from the following equation: porosity (%) of catalyst layer=[volume (cm$^3$) of catalyst layer−{volume (cm$^3$) of carbon catalyst+volume (cm$^3$) of electrolyte material}]/volume (cm$^3$) of catalyst layer×100.

That is, a value obtained by subtracting the total volume of the carbon catalyst and the electrolyte material from the volume of the catalyst layer was determined as the volume of voids (portions of the catalyst layer in which the carbon catalyst and the electrolyte material were not present) of the catalyst layer, and a ratio of the volume of the voids to the volume of the catalyst layer was calculated as the porosity (%) of the catalyst layer.

[Production of Fuel Cell]

A pair of gaskets were attached to the MEA produced as described above, and the resultant was further sandwiched between separators. Thus, a single cell of a fuel cell (polymer electrolyte fuel cell) was produced.

[Conductance of Catalyst Layer of Battery Cathode]

Through use of the single cell produced as described above, the conductance of the catalyst layer of the battery cathode was measured. The measurement of the conductance of the catalyst layer of the cathode was performed by a method described in a reference (A. P. Young, J. Stumper, and E. Gyenge, Journal of The Electrochemical Society, 156(8) B913-B922 (2009)) in which the frequency and the humidity of the cell were changed to values shown below.

Specifically, first, the temperature of the single cell was adjusted to 75° C., and a hydrogen gas at 120% RH and a nitrogen gas at 120% RH were supplied to an anode side and a cathode side, respectively. In measurement of alternating current impedance, a 1250 Solartron high frequency response analyzer (manufactured by Solartron Analytical) and SI 1287 Solartron potentiostat (manufactured by Solartron Analytical) were used by being connected to each other, and the application voltage and the potential amplitude were set to 450 mV and 10 mV, respectively. A nyquist plot of alternating current impedance was obtained while the frequency was gradually changed from 0.05 Hz to 20,000 Hz.

In order to derive the ionic resistance (Ri) of the catalyst layer of the cathode from the resultant nyquist plot, fitting was performed through use of ZPlot and ZView software. The reciprocal of the Ri was the conductance of the catalyst layer.

When, in the plot having been subjected to the fitting, the coordinates of an intersection point between a line obtained through linear approximation in a high-frequency region (45° region) and the real axis are defined as (Z1, 0), and the coordinates of an intersection point between the plot having been subjected to the fitting and the real axis are defined as (Z2, 0), Z2 corresponds to the resistance (Rc) of the electrolyte membrane, and Z1-Z2 corresponds to Ri/3. Therefore, Ri was calculated by tripling a value for the Ri/3 obtained through the above-mentioned measurement of alternating current impedance. Then, the reciprocal of the ionic resistance (Ri) of the catalyst layer of the cathode obtained as described above was obtained as the conductance of the catalyst layer of the cathode.

[Power Generation Performance of Fuel Cell]

The single cell produced as described above was arranged in an automatic fuel cell evaluation system (manufactured by TOYO Corporation). Then, a power generation test was performed by setting the temperature of the cell to 75° C., and supplying saturated humidified air (oxygen) (relative humidity: 100%) to a cathode side of the single cell at 160 mL/min at a back pressure of 70 kPa, and saturated humidified hydrogen (relative humidity: 100%) to an anode side of the single cell at 450 mL/min.

Specifically, the power generation test was performed by holding a current density of 0.5 A/cm$^2$ for 30 minutes, and then measuring a voltage at each current density while holding a current density within the range of from the maximum current density to 0 A/cm$^2$ in increments of 0.2 A/cm$^2$ for 5 seconds each. A voltage (mV) measured at a current density of 0.5 A/cm$^2$ in the first power generation test was evaluated as an initial power generation performance.

[Performance Maintenance Ratio of Fuel Cell]

After the above-mentioned power generation test, a current hold test (durability test) was performed. Specifically, first, the single cell of a fuel cell after measurement of the initial power generation performance was utilized as it was, and the temperature of the cell was set to 75° C. Saturated humidified air (oxygen) (relative humidity: 100%) was supplied to the cathode side of the single cell at 160 mL/min at a back pressure of 70 kPa, saturated humidified hydrogen (relative humidity: 100%) was supplied to the anode side of the single cell at 450 mL/min, and a current density of 0.5 A/cm$^2$ was held for 60 hours. After that (that is, after lapse of 60 hours from the start of the current hold test), a second power generation test was performed in the same manner as in the first power generation test.

Then, a performance maintenance ratio was evaluated as a ratio of power generation performance after 60 hours to the initial power generation performance. That is, the performance maintenance ratio was calculated from the following equation: performance maintenance ratio (%)={voltage (mV) measured at a current density of 0.5 A/cm$^2$ in second power generation test}/{voltage (mV) measured at a current density of 0.5 A/cm$^2$ in first power generation test}×100.

[Results]

The characteristics of the carbon catalyst and the electrolyte material used in the production of the cathode, the catalyst layer of the cathode, and the battery including the cathode in Example 1 to Example 14 and Example C1 to Example C4, are shown in FIG. 1. In FIG. 1, the true density of the carbon catalyst measured as described above was shown as the density (g/cm$^3$) of the catalyst. In addition, a value described in a catalog or a safety data sheet (SDS) of each perfluorocarbon sulfonic acid-based polymer or a value obtained by a measurement method in conformity with JIS Z 8807:2012 was shown as the density (g/cm$^3$) of the electrolyte material. With regard to the amount of the electrolyte material, in examples other than Example 1, Example 6, and Example C4, the catalyst layer of the cathode was produced by using the carbon catalyst and the electrolyte solution so that the weight ratio between the carbon catalyst and the electrolyte material contained in the catalyst layer, carbon catalyst:electrolyte material, was 1.00:0.67.

On the other hand, in Example 1, Example 6, and Example C4, the catalyst layer of the cathode was produced by using the carbon catalyst and the electrolyte solution so that the weight ratios between the carbon catalyst and the electrolyte material contained in the catalyst layer, carbon catalyst:electrolyte material, were 1.00:0.43, 1.00:0.54, and 1.00:1.00, respectively.

As shown in FIG. 1, the performance maintenance ratio (i.e., durability) of the battery was excellent in Example 1 to Example 14, in each of which the conductance of the catalyst layer of the cathode per 1 cm$^2$ of an electrode area was more than 100 S and less than 350 S (specifically, 130 S or more and 337 S or less) compared to Example C1 to Example C4, in each of which the conductance was 100 S or less or 350 S.

In this regard, among Example C1, Example C2, and Example 5, in which the electrolyte materials had different EW values, the performance maintenance ratio was excellent in Example 5, in which the electrolyte material having an EW value of 700 was used, compared to Example C1 and Example C2, in which the electrolyte materials having EW values of 1,100 and 830 were used, respectively.

In addition, among Example C3, Example 2, Example 3, Example 4, Example 7, Example 9, Example 11, Example 12, and Example 13, in which the electrolyte materials had different EW values, the performance maintenance ratio was excellent in Example 2, Example 3, Example 4, Example 7, Example 9, Example 11, Example 12, and Example 13, in each of which the electrolyte material having an EW value of 500 or more and 980 or less was used, compared to Example C3, in which the electrolyte material having an EW value of 1,100 was used.

In addition, between Example C4 and Example 5, in which the catalyst layers had different electrolyte ratios and different porosities, the performance maintenance ratio was excellent in Example 5, in which the catalyst layer had an electrolyte ratio of 40% and a porosity of 60.9%, compared to Example C4, in which the catalyst layer had an electrolyte ratio of 50% and a porosity of 52.9%.

In addition, between Example C2 and Example 7, that were different only in using different carbon catalysts, the performance maintenance ratio was excellent in Example 7, in which the carbon catalyst CA-II having a median diameter of 790 nm was used, compared to Example C2, in which the carbon catalyst CA-I having a median diameter of 570 nm was used.

Further, between Example 1 and Example 11, in which the catalyst layers had different electrolyte ratios and different porosities, the performance maintenance ratio was excellent in Example 11, in which the catalyst layer had an electrolyte ratio of 40% and a porosity of 61.3%, compared to Example 1, in which the catalyst layer had an electrolyte ratio of 30% and a porosity of 67.1%.

In addition, among Example 10, Example 11, and Example 14, in which the catalyst layers had different thicknesses and different porosities, the performance maintenance ratio was excellent in Example 10, in which the catalyst layer had a thickness of from 70 μm to 95 μm and a porosity of 61.4%, and in Example 11, in which the catalyst layer had a thickness of from 45 μm to 55 μm and a porosity of 61.3%, compared to Example 14, in which the catalyst layer had a thickness of from 15 μm to 25 μm and a porosity of 42.2%.

In addition, among Example 2, Example 3, and Example 4, in which the electrolyte materials had different EW values, the performance maintenance ratio was excellent in Example 3 and Example 4, in each of which the electrolyte material having an EW value of 900 was used, compared to Example 2, in which the electrolyte material having an EW value of 980 was used.

In addition, among Example 5, Example 8, and Example 11, that were different only in using different carbon catalysts, the performance maintenance ratio was excellent in Example 8, in which the carbon catalyst CA-III having a median diameter of 650 nm was used, and Example 11, in which the carbon catalyst CA-II having a median diameter of 790 nm was used, compared to Example 5, in which the carbon catalyst CA-I having a median diameter of 570 nm was used.

As described above, particularly in Example 3, Example 4, and Example 6 to Example 13, the performance maintenance ratio of the battery was 80% or more, and extremely good durability was achieved. Further, in Example 6 to Example 13, in each of which the electrolyte material having an EW value of less than 980 (specifically, 900 or less) was used, the power generation performance of the battery was more than 600 mV, and both extremely high power generation performance and excellent durability were achieved.

For example, it was considered that, when the electrolyte ratio and/or the porosity of the catalyst layer of the battery cathode was adjusted to fall within an appropriate range, supply efficiency of oxygen to the carbon catalyst contained in the catalyst layer through the electrolyte was effectively increased. Besides, it was considered that, when the EW value of the electrolyte material was adjusted to fall within an appropriate range, supply efficiency of protons to the carbon catalyst contained in the catalyst layer was effectively increased.

Moreover, in each of Examples of the present invention, a surprising effect that the performance maintenance ratio of the fuel cell, that is, the durability of the fuel cell, was remarkably improved by achieving both an increase in supply efficiency of oxygen and an increase in supply efficiency of protons to the carbon catalyst contained in the catalyst layer of the battery cathode, was confirmed.

The invention claimed is:

1. A battery cathode, comprising a catalyst layer,
    wherein the catalyst layer contains a mixture of a non-platinum catalyst having a particulate form with a median diameter of particles of the non-platinum catalyst being 600 nm or more and 1,000 nm or less, and an electrolyte material having an EW value of 300 or more and 900 or less,
    the non-platinum catalyst is dispersed in the electrolyte material,
    the catalyst layer has a thickness of 15 μm or more, a ratio of a weight of an electrolyte material to a total weight of the non-platinum catalyst and the electrolyte material contained in the catalyst layer of 32% or more and 48% or less, and a porosity of 43.0% or more and 66.0% or less, and
    the catalyst layer has a conductance per 1 $cm^2$ of an electrode area of more than 100 S and less than 350 S.

2. The battery cathode according to claim 1, wherein the non-platinum catalyst is a carbon catalyst.

3. The battery cathode according to claim 2, wherein the carbon catalyst contains a metal other than platinum.

4. The battery cathode according to claim 1, wherein the battery cathode is a cathode of a fuel cell.

5. A battery, comprising the battery cathode of claim 1.

6. The battery according to claim 5, wherein the battery is a fuel cell.

7. A composition for a catalyst layer of a battery cathode, which is used for forming a catalyst layer of a battery cathode and comprises a mixture of a non-platinum catalyst having a particulate form with a median diameter of particles of the non-platinum catalyst being 600 nm or more and 1,000 nm or less, and an electrolyte material having an EW value of 300 or more and 900 or less, the non-platinum catalyst being dispersed in the electrolyte material,
    wherein the composition is used for forming the catalyst layer having a thickness of 15 μm or more, a ratio of a weight of an electrolyte material to a total weight of the non-platinum catalyst and the electrolyte material contained in the catalyst layer of 32% or more and 48% or less, and a porosity of 43.0% or more and 66.0% or less, and having a conductance per 1 $cm^2$ of an electrode area of more than 100 S and less than 350 S.

* * * * *